United States Patent
Korolainen et al.

(10) Patent No.: US 7,883,454 B2
(45) Date of Patent: Feb. 8, 2011

(54) INNER ELONGATED STRUCTURE OF THE ROLL OF A PAPER/BOARD MACHINE OR FINISHING MACHINE

(75) Inventors: Tommi Korolainen, Jyväskylä (FI); Kari Holopainen, Muurame (FI); Ari Lehto, Leppävesi (FI)

(73) Assignee: Metso Paper, Inc., Helsinki (FI)

( * ) Notice: Subject to any disclaimer, the term of this patent is extended or adjusted under 35 U.S.C. 154(b) by 1171 days.

(21) Appl. No.: 10/599,179

(22) PCT Filed: Mar. 18, 2005

(86) PCT No.: PCT/FI2005/050091

§ 371 (c)(1), (2), (4) Date: Sep. 25, 2006

(87) PCT Pub. No.: WO2005/090802

PCT Pub. Date: Sep. 29, 2005

(65) Prior Publication Data

US 2007/0054792 A1     Mar. 8, 2007

(30) Foreign Application Priority Data

Mar. 23, 2004   (FI) .................................. 20045093

(51) Int. Cl.
*D21G 1/02* (2006.01)
*B25F 5/02* (2006.01)

(52) U.S. Cl. ............................................. 492/7; 492/50
(58) Field of Classification Search ..................... 492/7, 492/50, 37, 48, 59, 53, 41, 52; 29/895, 895.213, 29/895.22, 895.23, 895.3; 100/162 B, 163 A; 162/358

See application file for complete search history.

(56) References Cited

U.S. PATENT DOCUMENTS

| 5,509,883 A | 4/1996 | Niskanen et al. |
| 5,785,636 A | 7/1998 | Bonander et al. |

FOREIGN PATENT DOCUMENTS

| DE | 29613795 | 1/1997 |
| DE | 29613795 U1 | 1/1997 |
| WO | 99/58761 A1 | 11/1999 |
| WO | 2005/090802 A1 | 9/2005 |

OTHER PUBLICATIONS

International Search Report issued in PCT/FI2005/050091.

*Primary Examiner*—John C Hong
(74) *Attorney, Agent, or Firm*—Stiennon & Stiennon

(57) ABSTRACT

The roll of a paper/board machine or finishing machine has an inner elongated structure (11; 104) which is at least partly comprised of composite material, including reinforcing fibers in matrix material. The structure is preferably comprised of a combination of metallic material and composite material.

18 Claims, 9 Drawing Sheets

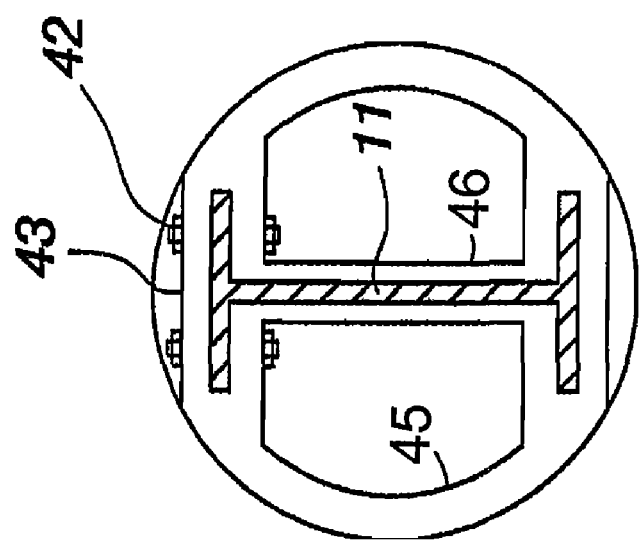
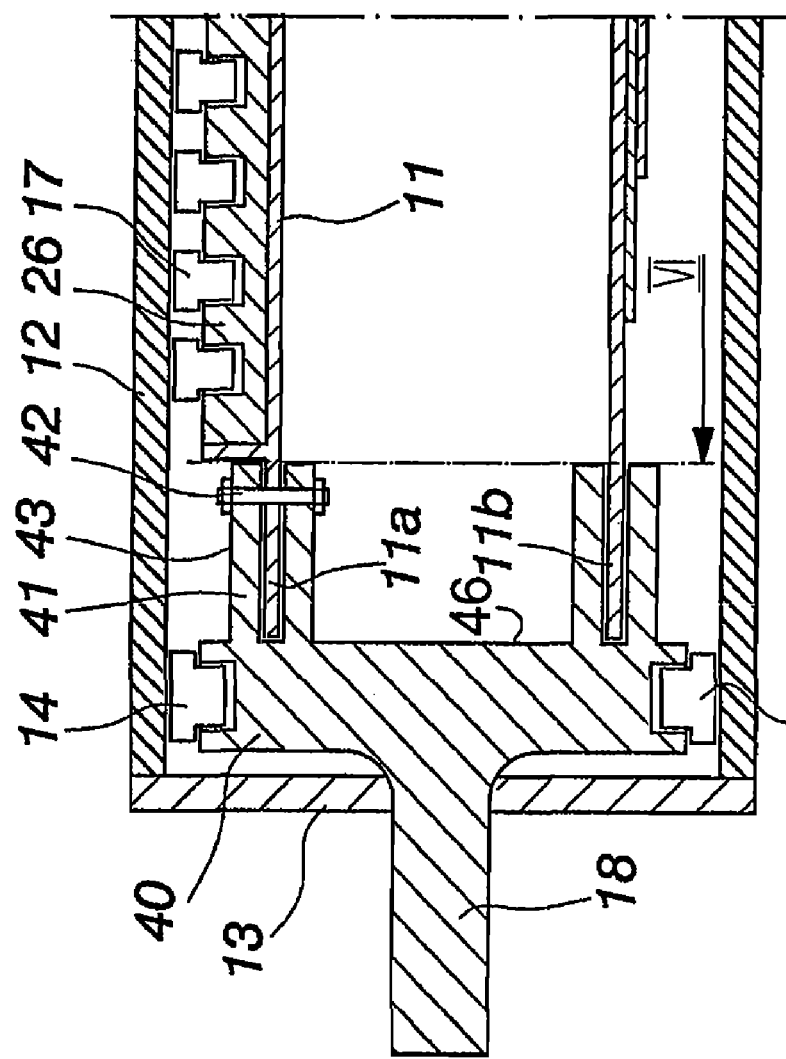
Fig. 6
Fig. 5

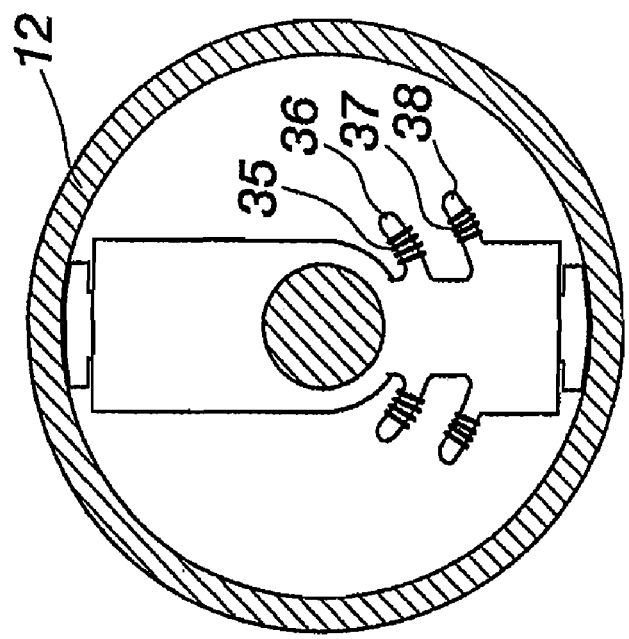
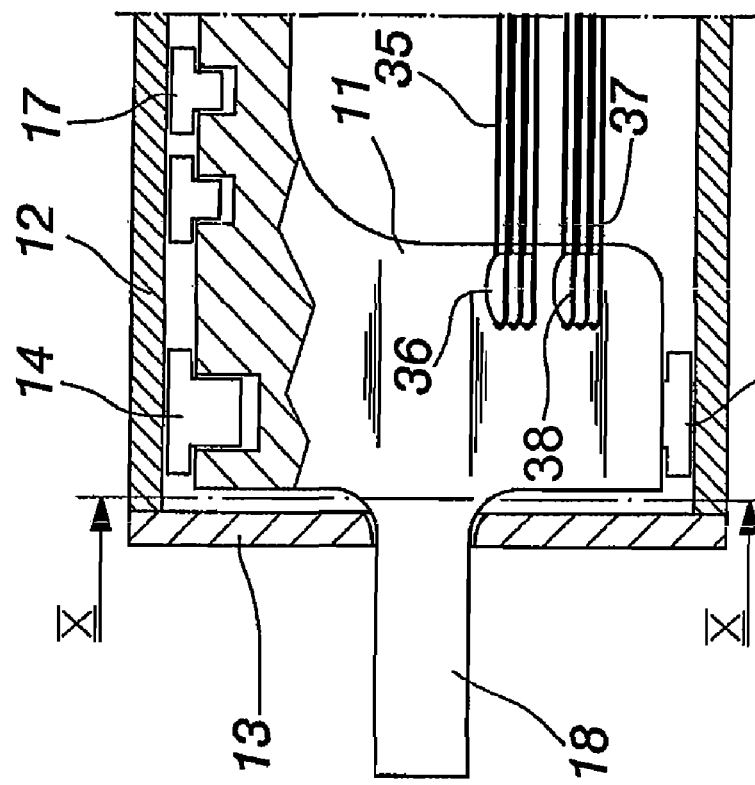

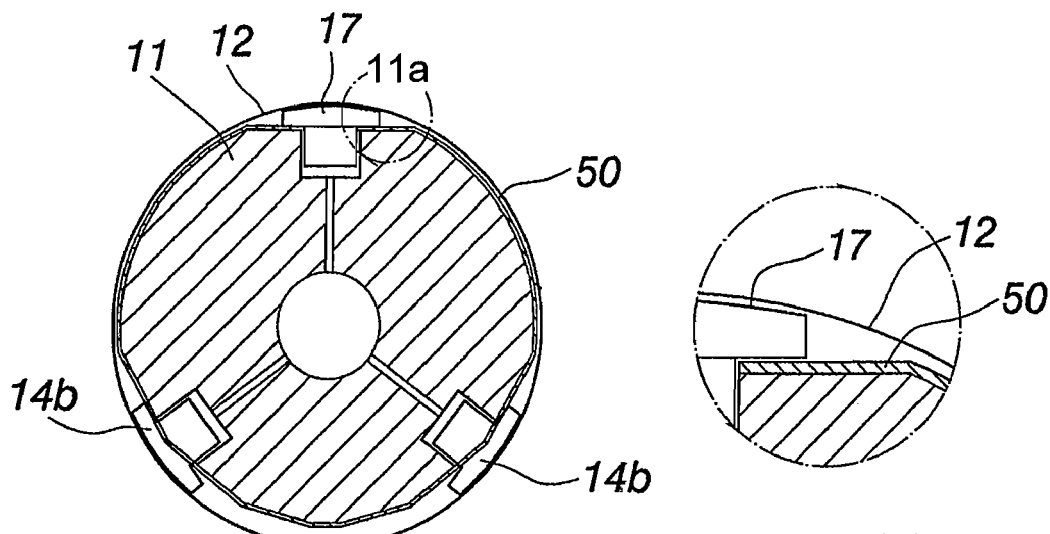
Fig. 11
Fig. 11a
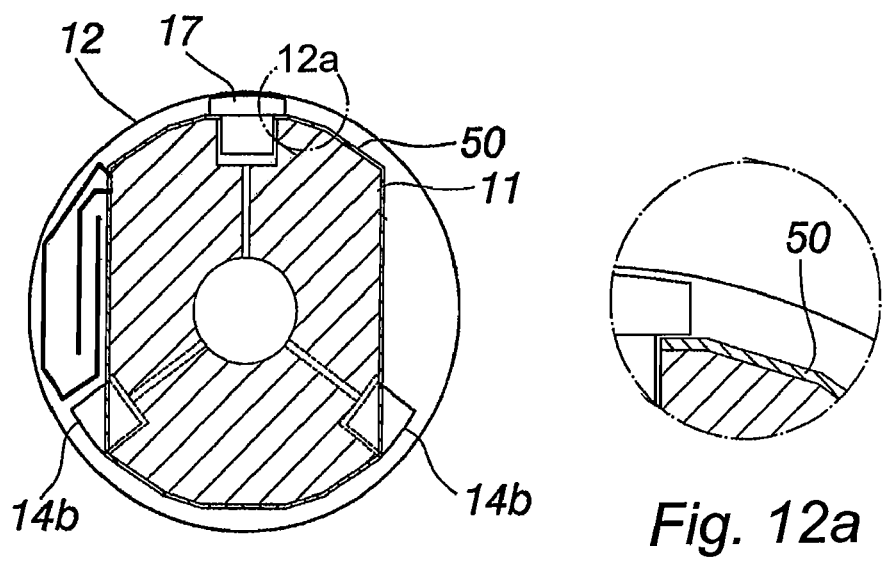
Fig. 12
Fig. 12a

INNER ELONGATED STRUCTURE OF THE ROLL OF A PAPER/BOARD MACHINE OR FINISHING MACHINE

CROSS REFERENCES TO RELATED APPLICATIONS

This application is a U.S. national stage application of International App. No. PCT/FI2005/050091, filed Mar. 18, 2005, the disclosure of which is incorporated by reference herein, and claims priority on Finnish App. No. 20045093, filed Mar. 23, 2004.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to the inner elongated structure of the roll of a paper/board machine or finishing machine, such as the shaft of a deflection-compensated roll or the suction box of a suction roll.

Current production paper machines run at speeds nearing 2000 m/min and machine widths come close to 11 m. The future development trend is to continue increasing these values.

Increasing both will bring about a changeover to dynamic dimensioning in current deflection-compensated rolls unless new ways are invented for manipulating the specific frequency of the roll so as to prevent the critical specific frequency from falling upon the running zone. A deflection-compensated roll comprises a stationary shaft and a shell arranged to rotate around it, the shell being supported on the shaft by loading elements which exert a loading force against the inner surface of the shell to load the shell towards the backing roll forming a nip with the said roll. In the modem, wider deflection-compensated rolls of calenders, it has been necessary to increase dimensioning by as much as four classes as a result of dynamic dimensioning, which incurs considerable additional expenses. The increase in roll mass also causes problems regarding crane capacity, especially in old mills.

In a suction roll, a perforated shell rotates fitted with bearings on thrust shafts. Inside the shell may be a single- or multi-chamber suction box, the apertures of which open— limited by sealing strips—onto the inner surface of the shell for directing the suction at a specific sector of the suction roll. At the ends of the roll are connectors by means of which external negative pressure can be connected to the suction box. While the negative pressure is connected, a vacuum is formed under the paper web through the wire or the felt. The pressure difference formed removes water from the web to the perforations in the shell or holds the web during transfer. The negative pressure in the chambers is determined in accordance with the intended use of the suction roll. A problem with suction rolls is the deflection of the suction box towards the inner surface of the roll shell while negative pressure is connected to the suction box. In this case, external pressure will deflect the suction box in the direction of its suction inlets, whereby the seals of the suction box are pressed more tightly against the inner surface in the central area of the roll shell, thus wearing the seals more in their center than on the edge zone.

In simplified form, the specific frequency of the roll is determined according to the following formula:

$$f_i = \frac{\lambda_i^2}{2 \cdot \pi \cdot L^2} \cdot \left(\frac{E \cdot I}{m}\right)^{1/2}$$

where
$\lambda$ is the support constant
L is roll width
EI is stiffness, and
and m is mass.

From this equation for specific frequency can be seen that its characteristics cannot be efficiently manipulated by any means other than by manipulating stiffness, when the mass remains approximately constant. Another way of eliminating the detrimental effects of the vibrations themselves is to provide so high roll-internal damping that specific frequencies will not be a disadvantage. The aim of the present invention is to provide a solution by means of which the above-mentioned problems can essentially be eliminated.

To achieve this aim, the solution relating to the invention for realizing the inner elongated structure of the roll of a paper/board machine or finishing machine is characterized in that the structure is comprised at least partly of composite material, including reinforcing fibers in matrix material.

SUMMARY OF THE INVENTION

According to a preferred embodiment of the invention, the inner elongated structure of the roll is the stationary shaft of a deflection-compensated roll having a frame part essentially of fiber-reinforced composite, on which frame part is formed a support part of steel extending in the longitudinal direction of the shaft for supporting the loading elements bearing the shell on the shaft. According to another preferred embodiment of the invention, the inner elongated structure of the roll is the stationary shaft of a deflection-compensated roll having a frame part essentially of metal, which is coated with fiber-reinforced composite material. According to yet another preferred embodiment of the invention, the structure is a suction box inside the suction roll, which is preferably made completely of composite material.

Composite material refers to a structure comprising reinforcing fibers, for example, carbon, boron or glass fibers or their mixtures, and a matrix material, which may be polymeric, ceramic or metallic. Ceramic material comprises different oxides and carbides, such as Al—, B—, Cr—, Ti—, Si—, Sn—, W—, Zn—, Zr— oxides and carbides or their mixtures, and different nitrides, such as Bn and $Si_3N_4$.

The invention is described in greater detail in the following, with reference to the accompanying drawings.

BRIEF DESCRIPTION OF THE DRAWINGS

FIG. 5 shows the end section of the roll of FIG. 3.

FIG. 6 shows the end section of FIG. 5 as seen in the direction of arrow VI.

FIG. 9 shows a longitudinal section of yet another end section of a deflection-compensated roll according to the invention.

FIG. 10 shows a view of the roll of FIG. 9 as seen from the end with the roll end removed.

FIG. 11 shows a diagrammatic cross-section of yet another deflection-compensated roll according to the invention.

FIG. 11a is an enlarged fragmentary view of the apparatus of FIG. 11 taken at the circle 11a.

FIG. 12 shows a diagrammatic cross-section of yet another deflection-compensated roll according to the invention.

FIG. 12a is an enlarged fragmentary view of the apparatus of FIG. 12 taken at the circle 12a.

DESCRIPTION OF THE PREFERRED EMBODIMENTS

Figure 1:
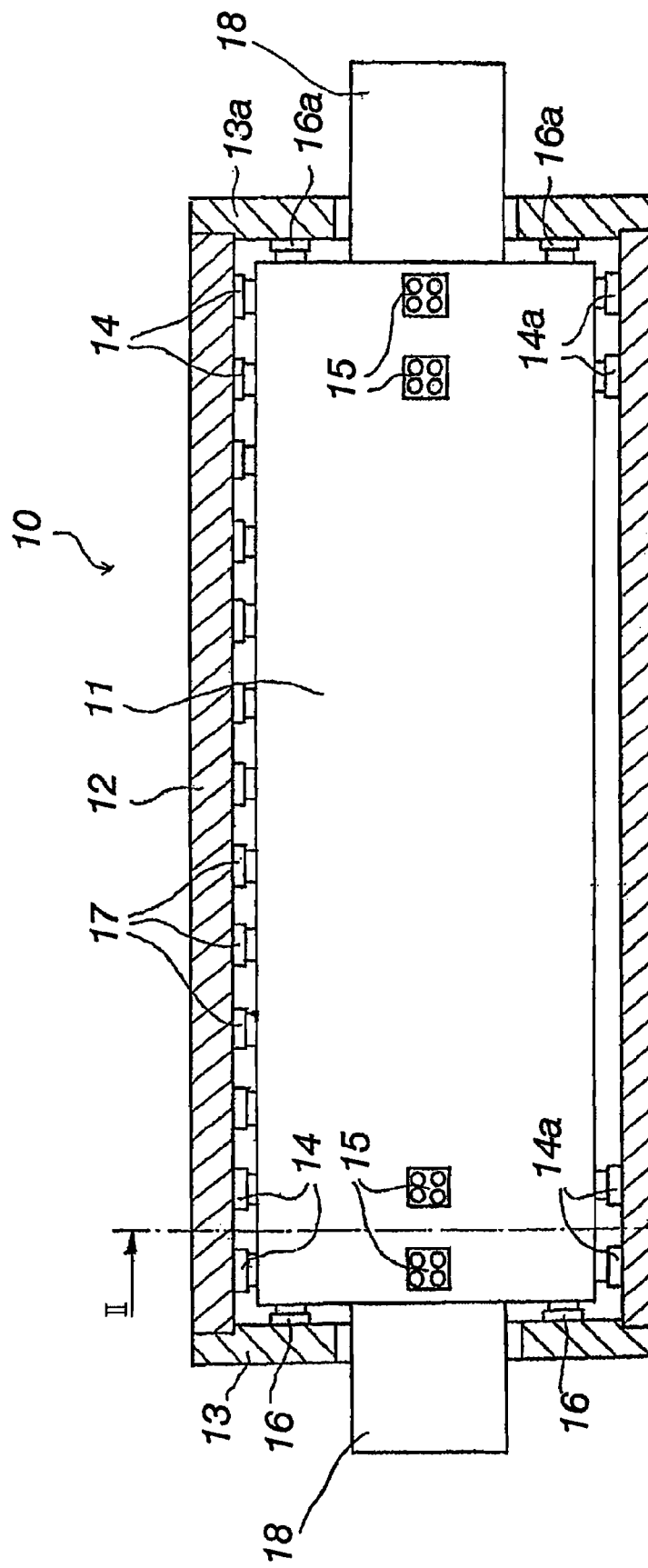
FIG. 1 shows a prior art deflection-compensated roll as a diagrammatic longitudinal section.
Figure 2:
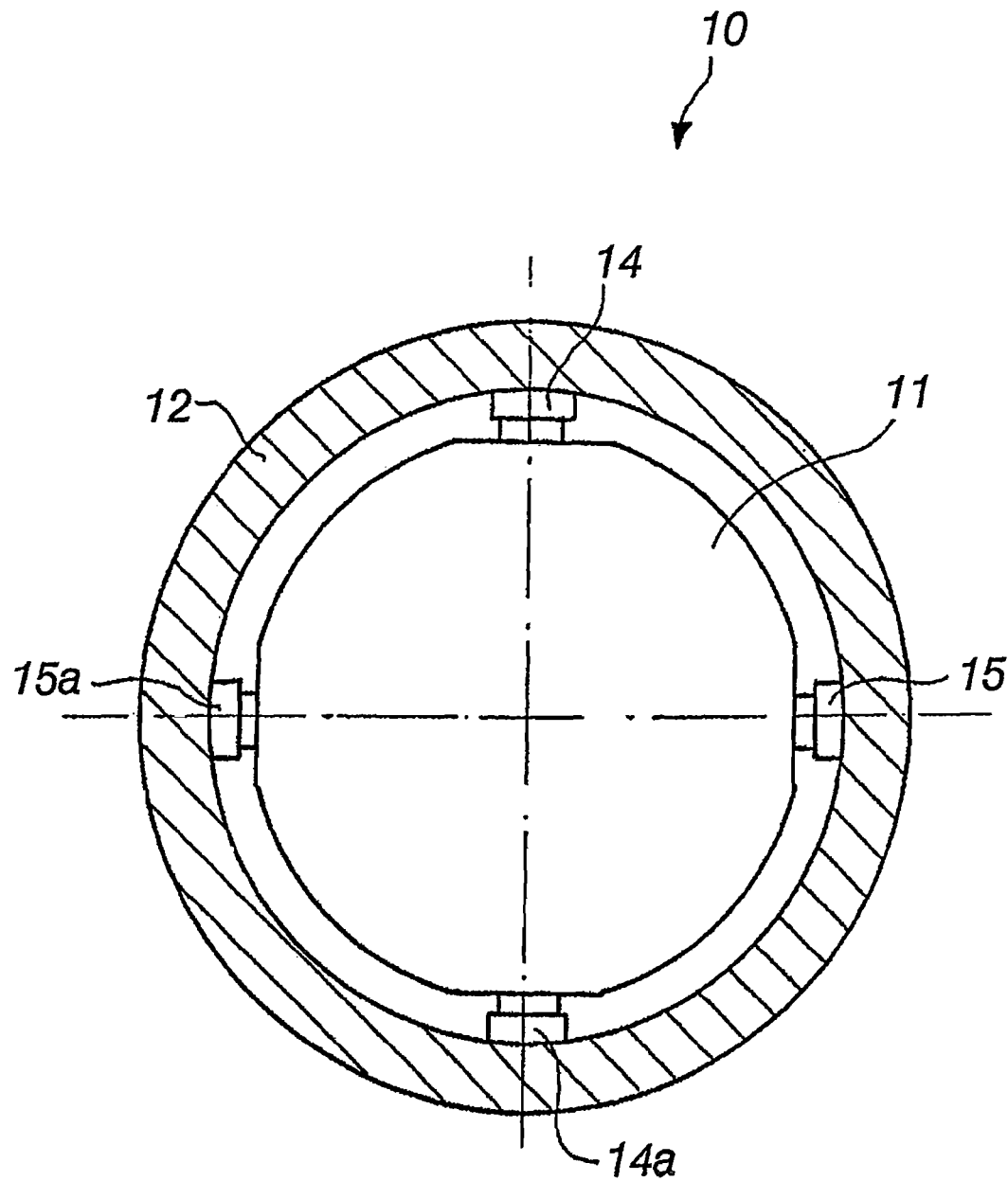
FIG. 2 is a cross-sectional view of the roll of FIG. 1 taken along section line II-II.
Figure 3:
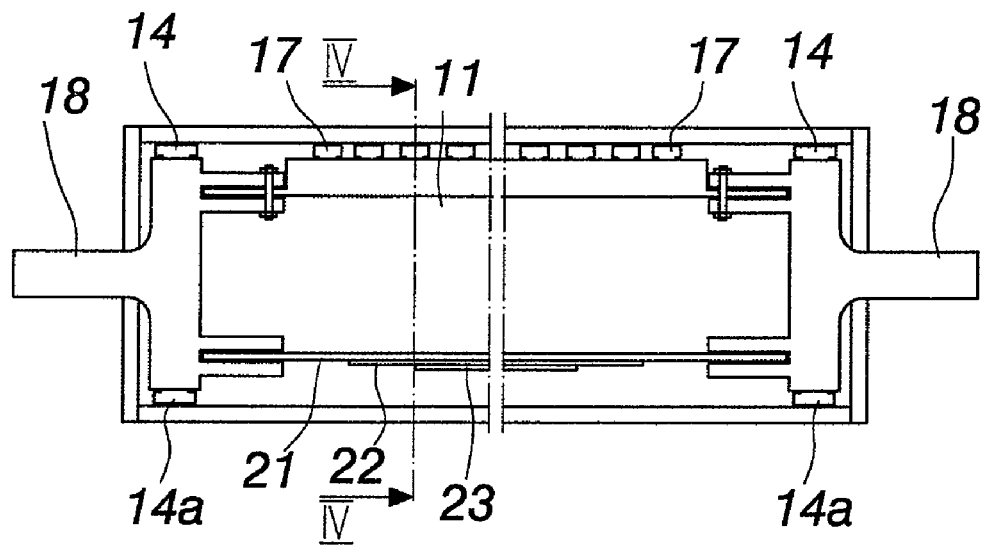
FIG. 3 shows a deflection-compensated roll according to the invention as a diagrammatic longitudinal section.
Figure 4:
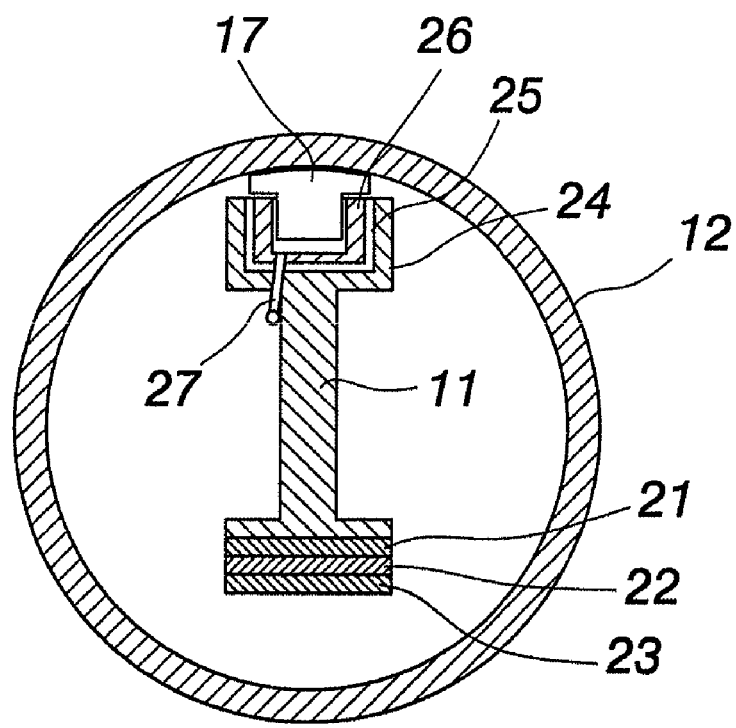
FIG. 4 is a cross-sectional view of the roll of FIG. 3 taken along section line IV-IV.

FIGS. 1 and 2 show diagrammatically a prior art deflection-compensated roll 10 comprising a stationary roll shaft 11, around which a roll shell 12 is arranged to rotate. The roll shell 12 is supported on the roll shaft 11 by means of hydraulic loading elements 17. The hydraulic loading elements act in the direction of the nip plane, and by means of them, the nip profile of the roll can be controlled in the longitudinal direction of the roll. The roll shaft 11 is connected to the roll's support structures by means of shaft journals 18. In the example disclosed, the roll 10 is provided with slide bearings 14, 14a acting on the main loading plain of the roll, whereby the bearings 14 act in the direction of the nip, that is, in a direction opposite to the loading direction, and the bearings 14a act in the opposite direction with respect to these. The roll further comprises lateral slide bearings 15, 15a, which act in a transverse direction with respect to the main loading direction, and axial slide bearings 16, 16a acting in the axial direction, which rest on the roll ends 13, and 13a, respectively, through a lubricant film. Slide bearings 14, 15, 14a, 15a acting in the radial direction, rest, for their part, against the inner surface of the roll shell 12 through the lubricant film. A roll of this type is known, for example, from U.S. Pat. No. 5,509,883, and is thus not described in greater detail in this connection.

FIGS. 3 to 6 show a deflection-compensated roll realized according to the invention, where the same or similar parts are referred to by the same reference numerals as in FIGS. 1 to 2. In this embodiment, the roll shaft 11 is comprised of a beam, essentially I-shaped in cross-section, which is made of composite material, preferably of carbon fiber reinforced material, by lamination. In the upper part of the beam 24 is formed a longitudinal groove, in which a support part 26 of steel or cast iron is positioned by means of an intermediate layer. The intermediate layer 25 evens out differences in thermal expansion and fixes the support part to the fiber-reinforced frame 11. On the support part 26 are formed bores for hydraulic loading elements 17. Reference numeral 27 denotes a feed pipe for supplying hydraulic medium to the chamber beneath the loading element 17. On the bottom part of the I-beam have been added fiber-reinforced plates 21, 22, 23 to areas requiring additional stiffness, as determined on the basis of the moment of deflection. The stiffening plates 21-23 can be joined together and to the I-beam, for example, by means of gluing with matrix material or by means of a bolted joint. The I-beam is connected to the thrust shaft 40, for example, in the manner shown in FIGS. 5 and 6. The thrust shaft 40 comprises an inwards directed roll fixing part 41 to which are formed the protruding ends 11a, 11b of the I-beam, and grooves for receiving the web part between them. The interlocking of the I-beam and the thrust shaft is secured by bolted joints 42, the said bolts extending from the level 43 formed on the upper surface of part 41 to the recesses 45 and 46, the said recesses being arranged to lighten the thrust shaft. Locking may also be carried out, for example, by gluing instead of by bolted joints. The stresses exerted on the joint are not very high because the moment of deflection is small compared with the central part of the beam. This solution makes possible the relatively simple assembly of the roll. Depending on the loading forces, the upper part 24 of the I-beam may also be made completely of steel or cast iron, in which case no separate intermediate layer 25 or support part 26 will be required. An upper part of steel or cast iron may also be fixed, for example, by gluing with matrix material to the fiber-reinforced frame 11. It is also conceivable to make the shaft completely of composite material.

Figure 7:
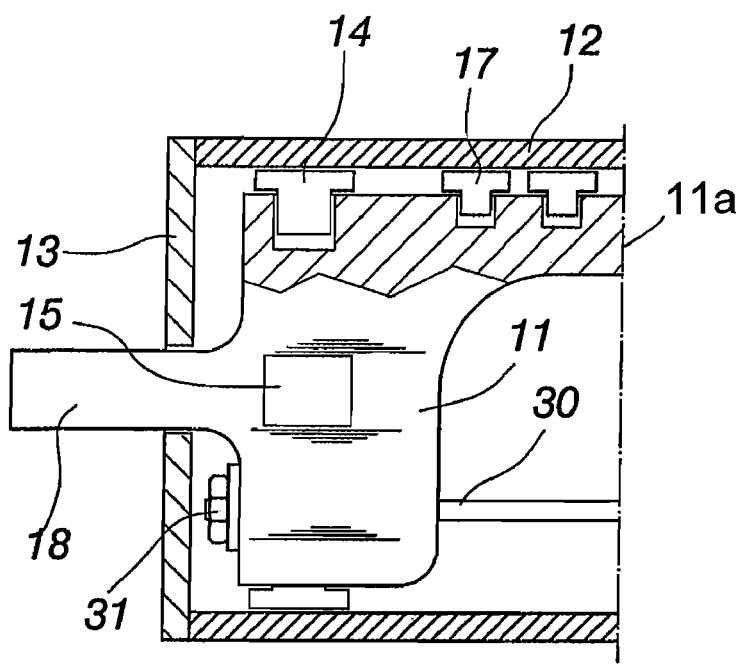
FIG. 7 shows a diagrammatic longitudinal section of the end section of another deflection-compensated roll realized according to the invention.

FIG. 7 shows another deflection-compensated roll realized according to the invention, wherein the frame of the roll shaft 11 is steel and forms an integrated structure with the shaft journal 18. The frame part is lightened in the area between the end sections where it is comprised of a relatively thin support part 11a, which receives the compressive stresses. Nip loads cause compressive stresses on the shaft on the loading element 17 side, and tensile stresses on the lower part. To receive the tensile stresses, between the end parts of the shaft are arranged fiber-reinforced bars or plates 30 running through the end parts and locked in place by locking means 31, which is a locking nut in FIG. 7. The bars or plates 30 are preferably of carbon fiber reinforced composite.

Figure 8:
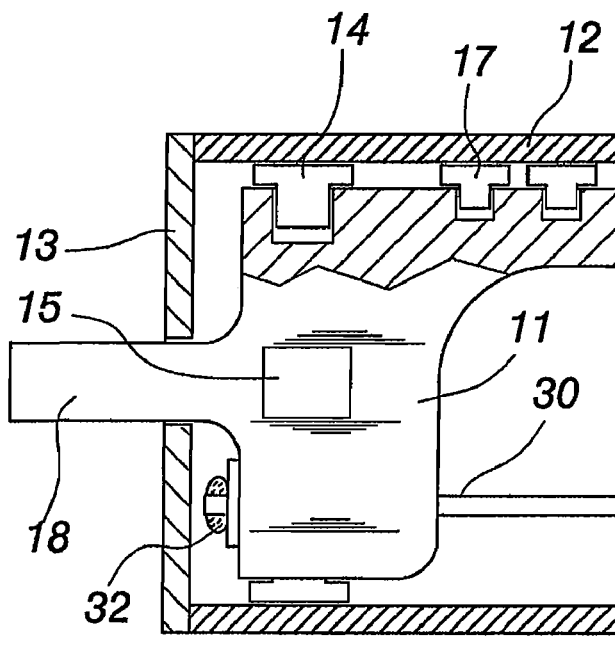
FIG. 8 shows a modification of the embodiment of FIG. 7.

The embodiment of FIG. 8 differs from that of FIG. 7 only as regards the locking means 32, which are made by winding of reinforcing fibers and by fixing with matrix material to the bar or plate 30.

In the embodiment according to FIGS. 9 and 10, on the end parts of the roll shaft are formed mounting projections 36, 38, and opposite end parts are joined with each other by means of reinforcing fibers dipped in matrix material and wound in the longitudinal direction of the shaft, which form bundles 35, 37 of composite material which receive the tensile stresses. Using the mounting projections makes it possible to wind the reinforcing fibers into one loop, whereby the strength of the structure is better than when using, for example, the separate locking means according to FIGS. 7 to 8, where the joint becomes weaker than the basic materials, whereby the structure must be dimensioned according to the strength of the joint. In the solution according to FIGS. 9 and 10, dimensioning takes place in accordance with the composite material and shaft material, for example, steel or cast iron.

An additional advantage in the embodiments of FIGS. 7 to 10 is the free space remaining also on the neutral axis which may be utilized in positioning the hydraulic pipes of the loading elements.

FIGS. 11, 11a, 12 and 12a show some further embodiments of the deflection-compensated roll according to the invention, with the elimination of disadvantageous vibration as the starting point. This has been realized by adding a coating 50 of composite material on the existing roll shaft 11. FIG. 11 shows a diagrammatic, cross-sectional view of a deflection-compensated roll provided with an almost round-profiled shaft 11, and FIG. 12 shows a deflection-compensated roll with a so-called movable shell, the shaft of which is essentially rectangular in cross-section. Reference numeral 14b denotes the bearing means of the roll.

The coating 50 may be formed, for example, by providing the shaft first with a base treatment, for example, with glue, and by then winding a reinforcing fiber layer of, for example, glass fiber or carbon fiber, around the shaft, and by adding the matrix material to the reinforcing fiber layer. The addition of matrix material can be carried out, for example, by dipping the fibers to be wound in matrix material before winding, or by spraying matrix material on the surface of the shaft while winding the fibers. After coating, bores for the loading elements 17 and bearing elements 14b may be finishing cut on the shaft through the coating, and the means to be fixed on the shaft, such as oil collection means, may be added. Coating made by winding also makes possible relatively easy coating of shafts provided with straight surfaces (FIG. 12).

Figure 13:
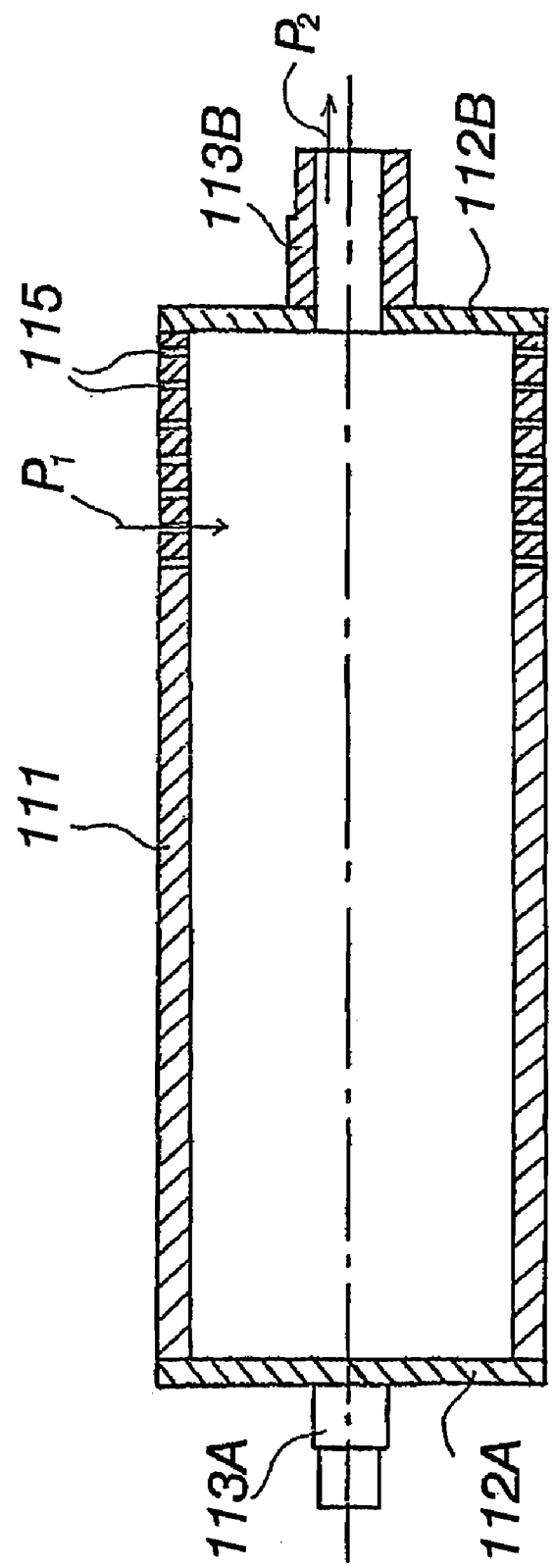
FIG. 13 shows a diagrammatic longitudinal section of a prior art suction roll.

FIG. 13 shows a view in principle of a prior art suction roll without an internal suction box. The suction roll comprises a roll shell 111 which is fitted with bearings to rotate on shaft journals 113A and 113B which are connected to the roll shell 111 through end flanges 112A and 112B. The roll shell 111 has a perforation comprised of numerous apertures 115 extending through the roll shell 111. FIG. 13 shows only a part of the perforation of the shell 111. At least one of the shaft journals 113B comprises connectors leading to the interior of the roll, to which an external negative pressure source (not shown) can be connected. By means of the negative pressure source, air is sucked out (arrow $P_2$) through the sector formed by the suction box, whereby a corresponding amount of air (arrow $P_1$) will flow inside the roll through the perforation of the roll shell.

Figure 14:
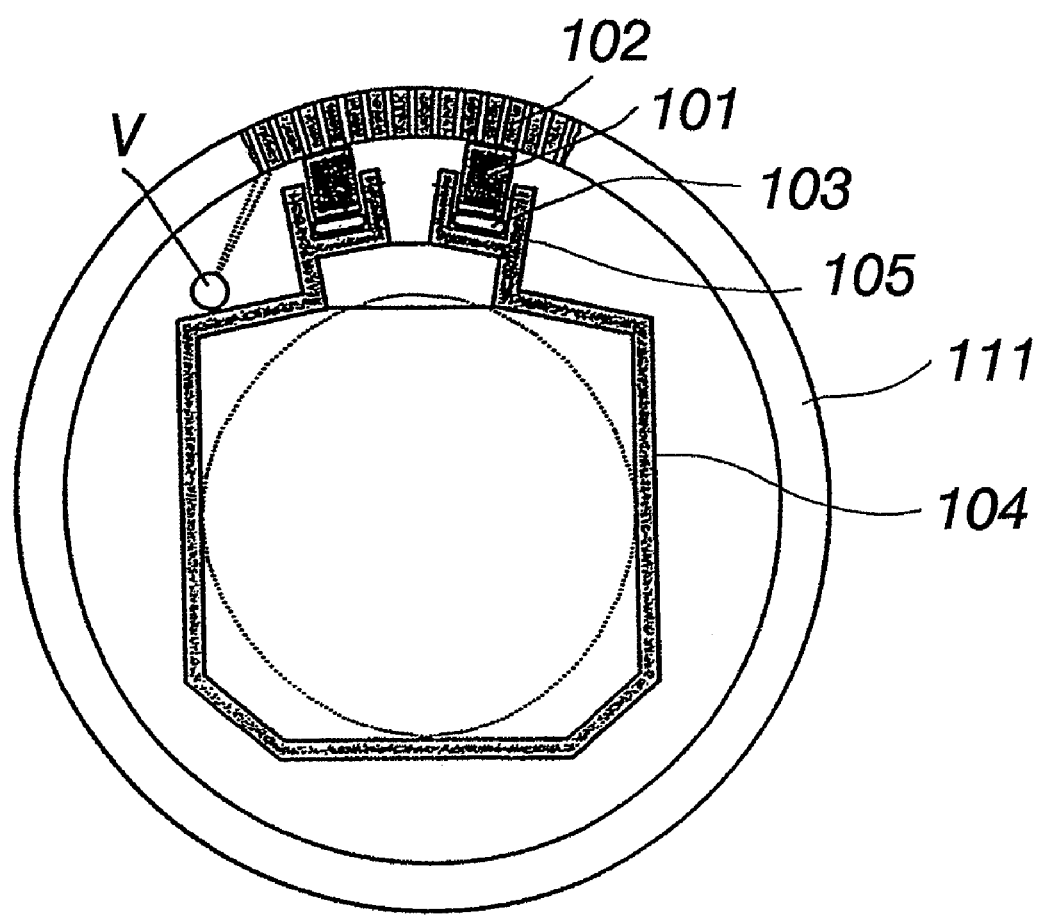
FIG. 14 shows a diagrammatic cross-section of the suction roll of FIG. 13.

FIG. 14 shows the suction roll of FIG. 13 in cross-section and with the suction box mounted inside it. The suction box 104 and the seal holder part 105 are rigidly fixed to each other. The seals 101 are loaded against the shell 111 by means of loading tubes 103, whereby the seals are made to press against the shell at approximately constant pressure even when the suction box is in a deflected situation. Because of the seal pressure, water lubrication V is necessary to reduce wear on the inner surface of the roll shell. When negative pressure is switched on in the suction box 104, it deflects towards the inner surface of the shell. Deflection is strongest in the longitudinal central area of the roll, while the ends of the suction box remain in place. Nowadays, suction boxes are usually made of relatively thin sheet metal, whereby increasing rigidity by increasing thickness would increase weight which is not desirable. The deflection of the suction box can be reduced in accordance with the invention by making, for example, the seal holder part 105 or the entire suction box 104 of composite material, which makes possible greater rigidity with less weight.

The invention claimed is:

1. A roll assembly in a paper/board machine or finishing machine comprising:
    an inner non-rotating fiber reinforced material beam; and
    a roll shell mounted for rotation on and with respect to the inner non-rotating fiber reinforced material beam, wherein the inner non-rotating fiber reinforced material beam is at least partly comprised of composite material of reinforcing fibers in a matrix of polymeric material;
    wherein the fiber reinforced material beam has upper portions which define a longitudinal groove in which a support part holds a plurality of support elements in supporting engagement with the roll shell, the support part being of steel or cast iron and positioned on the fiber reinforced material beam by means of an intermediate layer which is selected to even out differences in thermal expansion between the support part and the beam and which intermediate layer fixes the support part to the fiber reinforced material beam.

2. The assembly of claim 1, wherein the inner non-rotating fiber reinforced material beam is essentially an I-shape in cross-section mounted between opposed thrust shafts.

3. The assembly of claim 2, wherein the fiber reinforced material beam has a bottom portion to which are joined fiber-reinforced plates.

4. The assembly of claim 2 wherein the fiber reinforced material beam has I-shaped ends mounted in receiving grooves in the thrust shafts.

5. The assembly of claim 4 wherein the I-shaped ends are secured by bolted joints to the thrust shafts.

6. The assembly of claim 4 wherein the I-shaped ends are secured by gluing to the thrust shafts.

7. The assembly of claim 1 wherein the fiber reinforced material beam has a first end mounted in receiving grooves in a thrust shaft.

8. The assembly of claim 1 wherein the roll shell is supported in a deflection-compensated way on the inner non-rotating fiber reinforced material beam which forms a stationary shaft extending in a longitudinal direction, the shell being supported on the shaft by a plurality of loading elements, wherein the stationary shaft has a frame part made of composite material of reinforcing fibers in a matrix of polymeric material, to which is mounted a support part of steel or cast iron extending in the longitudinal direction of the shaft for receiving the loading elements and for supporting them on the shaft arranged so as to exert a loading force against an inner surface of the shell to load the shell toward a backing roll forming a nip with the said roll.

9. The assembly of claim 1 further comprising stiffening plate elements of composite material of reinforcing fibers in a matrix of polymeric material for increasing the flexural stiffness of the fiber reinforced material beam which forms a shaft at selected points in the longitudinal direction of the shaft, mounted to a side of the shaft opposite to the support part and under tensile stress.

10. The assembly of claim 1 wherein the roll shell is supported in a deflection-compensated way on the inner non-rotating fiber reinforced material beam which forms a stationary shaft extending in a longitudinal direction, the shell being supported on the shaft by a plurality of loading elements, and wherein the stationary shaft has a frame part of metal coated with fiber-reinforced composite material.

11. A roll assembly in a paper/board machine or finishing machine comprising:
    an inner non-rotating structure; and
    a roll shell mounted for rotation about the inner non-rotating structure, wherein the inner non-rotating structure is at least partly comprised of a fiber-reinforced polymeric material;
    wherein the inner non-rotating structure is a beam having a fiber-reinforced polymeric material lower portion and an upper part made of steel or cast iron fixed to the fiber-reinforced lower portion.

12. The assembly of claim 11, wherein the upper part holds a plurality of support elements in supporting engagement with the roll shell.

13. A suction roll assembly in a paper/board machine or finishing machine comprising:
    an inner non-rotating suction box structure; and
    a roll shell which is perforated, mounted for rotation about and with respect to the inner non-rotating suction box structure, wherein the inner non-rotating suction box structure is at least partly comprised of composite material of reinforcing fibers in a matrix of polymeric material;

wherein the suction box has seals mounted to holder structures of composite material of reinforcing fibers in a matrix of polymeric material, which form part of the suction box structure.

14. The assembly of claim 13 wherein the suction box is comprised essentially completely of composite material of reinforcing fibers in a matrix of polymeric material.

15. The assembly of claim 14 wherein the reinforcing fibers of the composite material extend essentially in a longitudinal direction of the suction box structure.

16. A roll assembly in a paper/board machine or finishing machine comprising:

a roll shell;

an inner non-rotating structure, wherein the roll shell is mounted for rotation about the inner non-rotating structure;

wherein the inner non-rotating structure comprises a steel or cast iron frame formed as an integrated structure with opposed end parts, each opposed end part having an opposed shaft journal by which the inner non-rotating structure is mounted;

wherein the opposed shaft journals define a neutral axis and wherein the frame has portions which define a free space in the frame in an area between the end parts where portions of the frame do not extend below the neutral axis, the frame defining a portion above the free space which comprises a member in compression; and a fiber reinforced bar or plate connecting the opposed end parts and extending across the free space below the neutral axis to form a member in tension.

17. The roll assembly of claim 16 wherein the fiber-reinforced bar or plate extends through each opposed end part and is locked in place to each opposed end part.

18. The roll assembly of claim 16 wherein on each end part of the inner non-rotating structure are formed mounting projections; and wherein the opposite end parts are joined with each other by reinforcing fibers dipped in matrix material and wound in a longitudinal direction with respect to the frame neutral line, the reinforcing fibers dipped in matrix material forming the fiber reinforced bar or plate.

* * * * *